United States Patent
Bakker et al.

[11] Patent Number: 5,817,363
[45] Date of Patent: Oct. 6, 1998

[54] FOOD DRESSING

[75] Inventors: Marinus Adriaan Evert Bakker, Maasluis; Petronella Clementia Maria Weisenborn, Den Bosch, both of Netherlands

[73] Assignee: Thomas J. Lipton Co., Division of Conopco, Inc., Englewood Cliffs, N.J.

[21] Appl. No.: 686,230

[22] Filed: Jul. 23, 1996

[30]  Foreign Application Priority Data

Aug. 8, 1995 [EP] European Pat. Off. .............. 95202158

[51] Int. Cl.$^6$ ...................... A23L 1/0526; A23L 1/0522; A23C 21/00
[52] U.S. Cl. ........................ 426/573; 426/583; 426/602; 426/656; 426/578
[58] Field of Search .................................. 426/602, 605, 426/656, 583, 613, 573, 578

[56]  References Cited

U.S. PATENT DOCUMENTS

| | | | |
|---|---|---|---|
| 4,107,334 | 8/1978 | Jolly | 426/656 |
| 4,143,174 | 3/1979 | Shah | 426/583 |
| 4,734,287 | 3/1988 | Singer | 426/605 |
| 4,885,179 | 12/1989 | Soucie et al. | 426/104 |
| 4,956,193 | 9/1990 | Cain | 426/578 |
| 5,104,674 | 4/1992 | Chen | 426/613 |
| 5,139,811 | 8/1992 | Singer | 426/656 |
| 5,232,731 | 8/1993 | Cain | 426/656 |
| 5,342,643 | 8/1994 | Wolf | 426/602 |
| 5,494,696 | 2/1996 | Holst | 426/656 |

FOREIGN PATENT DOCUMENTS

| | | |
|---|---|---|
| 250 623 | 1/1988 | European Pat. Off. . |
| 323 529 | 7/1989 | European Pat. Off. . |
| 603 981 | 6/1994 | European Pat. Off. . |
| 2 243 692 | 3/1974 | Germany . |
| 2 078 483 | 1/1982 | United Kingdom . |
| WO 87/00009 | 1/1987 | WIPO . |
| WO 94/14334 | 7/1994 | WIPO . |
| WO 94/21129 | 9/1994 | WIPO . |

OTHER PUBLICATIONS

Lehninger 1970 Biochemistry Worth Publishers Inc pp. 58,59,60.

*Primary Examiner*—Carolyn Paden
*Attorney, Agent, or Firm*—James J. Farrell

[57]  ABSTRACT

Food dressing constituted of an aqueous phase and 0–40 wt. % of fat and/or oil, further containing a non-ionic thickening agent and an electrolyte and having a pH not greater than 4, and which contains also 3–8 wt. % of heat denatured globular protein, which dressing is prepared by a process comprising the steps a. dissolving a globular protein, a non-ionic thickening agent and an electrolyte in water, b. adjusting the pH to <4 by adding acid, c. heating and slowly stirring the solution so that protein denaturation occurs, d. cooling, e. optionally admixing other ingredients, where, optionally, step d follows step e.

13 Claims, No Drawings

FOOD DRESSING

The present invention is concerned with a food dressing, particularly an acidic food dressing and with a process for its preparation.

BACKGROUND OF THE INVENTION

Food dressings should have a consistency which allows easy and effective spreading over and/or mixing with food. The dressing may have a spoonable or pourable rheology. It can be prepared with or without the use of oil. If oil is used it should be dispersed equally through the water phase of the dressing.

An increasing number of consumers prefer dressings with a reduced amount of fat. It is not easy to prepare a low-fat dressing having a good taste as well as the right rheology. To compensate for the reduced amount of oil, stabilizing agents, in particular thickening agents, have to be added.

According to EP 250 623, non-aggregated particles of denatured dairy whey protein are used for mimicking the rheology of fat. However, a considerable amount (about 14 wt. %) of such particulate protein is necessary for structuring dressings. As a result of the acid buffering capacity of the proteins, to attain a pH <4, a large amount of acid has to be added, which makes the dressing unacceptably sour and causes disintegration of the particles.

EP 603 980 discloses the use of heat denatured protein for the preparation of emulsion type dressings. The composition is not suited for the preparation of fat-free dressings. The process is rather complex and comprises a two-step heating treatment and, additionally, a homogenisation step for dispersion of the fat droplets.

According to U.S. Pat. No. 4,885,179, in order to structure the aqueous phase of a dressing, use is made of a fibrous complex prepared from an ionic thickener, xanthan, and a protein. Xanthan, being of bacterial origin is, however, a less desired thickener.

WO 87/00009 discloses a shelf-stable acidic dressing (pH <4.1) comprising fibrous xanthan gum—protein complexes.

SUMMARY OF THE INVENTION

The invention provides a process for the preparation of a dressing having an aqueous phase, an optional fat phase and a pH <4, and comprising a heat-denatured globular protein, a non-ionic thickening agent and an electrolyte, the process comprising the steps of a. dissolving a globular protein, a non-ionic thickening agent and an electrolyte in water to form a protein solution, b. adjusting the pH to <4 by adding acid, c. heating and slowly stirring the protein solution so that protein denaturation occurs, d. cooling, e. optionally admixing other ingredients, where, optionally, step d follows step e.

The dressing possesses a proper rheology, a mild sour taste, a smooth mouthfeel and is stable on storage.

DESCRIPTION OF THE PREFERRED EMBODIMENTS

The dressing preparation comprises the steps of a. dissolving a globular protein, a non-ionic thickening agent and an electrolyte in water, b. adjusting the pH to <4 by adding acid, c. heating and slowly stirring the solution so that protein denaturation occurs, d. cooling, e. optionally admixing other ingredients, where, optionally, step d follows step e.

A suitable denaturation temperature is 80°–100° C., preferably about 85° C. In order to induce protein denaturation the protein solution is kept at that temperature under gentle stirring, suitably for 5–60 minutes, preferably for 5–30 minutes, usually for about 10 minutes, until a proper consistency is obtained. Obviously, at higher temperatures, a shorter time is needed. High temperatures and/or long heating times are to be avoided, however, since an off-taste may occur, particularly when whey protein is present.

The combination of denatured globular protein and a non-ionic thickening agent appears to impart to the dressing a fine, smooth texture.

When globular protein is used alone, a heat-induced protein gel is formed. However, such a gel is very elastic and has an extremely sour taste. Also, as a result of the high buffering capacity of proteins, much acid has to be added to reach a pH of 3–4 for dressings.

By adding an electrolyte, it is possible to influence the gelation behaviour of proteins in such a way that gels with a reduced protein content, and therefore with a less sour taste, can be prepared.

By also adding a non-ionic thickening agent, the elastic texture of the gel is rendered more plastic. Ionic thickening agents (e.g. xanthan gum) are ineffective, because interaction between the protein and molecules of the ionic thickening agent result in phase separation.

Thus, the dressing of the present invention requires a globular protein, an electrolyte and a non-ionic thickening agent as essential components in its preparation. The resulting dressing is structured by the heat-induced protein gel and has a plastic, smooth texture and an agreeable mildly-sour taste.

Moreover, the resulting dressing has a more fatty mouthfeel than dressings prepared using traditional thickening agents such as starches, and has a 'lighter' mouthfeel.

The globular protein is preferably whey protein. It is used in a concentration of 3–8 wt. %, preferably about 4–7 wt. %. All percentages in this specification are calculated on aqueous phase unless indicated otherwise.

According to the invention, the globular protein, which has been denatured in the presence of a non-ionic thickener and an electrolyte, is employed to give structure. The incorporation of such denatured protein is accomplished as part of the processing of the dressing, using a simple preparation method for which no expensive equipment is necessary.

The non-ionic thickener is chosen preferably from the group consisting of non-ionic modified starches e.g. Col-Flo Flo 67 (Trade Mark of National Starch Corporation, USA) and non-ionic gums, such as locust bean gum and guar gum.

The amount of thickening agent depends on its nature, but usually is in the range of 0.1–0.5 wt. % in the case of gums and 1.0–3.0 wt. % in the case of modified starch. A suitable amount for the gums is about 0.25 wt. % and for the modified starches is about 1.5 wt. %.

For the formation of a proper rheology, the composition also needs an electrolyte, preferably in an amount of 0.1–0.5 wt. %. Any food grade electrolyte may be used, but a proper choice is cooking salt. The addition of salt enables a relatively low amount of protein and, consequently, a relatively low amount of acid needed to attain the proper pH.

Optionally, the obtained dressing base can be admixed with taste and flavour additives such as herbs, spices and vegetables.

Fats, such as triglyceride fat, may be dispersed in the proteinaceous aqueous phase, for example, up to 10 wt. % on dressing weight. Oil may be added, to contribute a creamy taste. Suitable oils are rapeseed oil, sunflower oil, cotton oil, soybean oil or mixtures thereof. Oil is an optional ingredient and is not necessary for building the structure of the dressing. The total amount of fat and/or oil should preferably not exceed 40 wt. % on dressing weight.

The pH is adjusted to 3.0–4.0 for example, and preferably to 3.5–4.0, by adding a suitable acid such as acetic acid or lactic acid.

The thickening agent and the electrolyte are admixed before the denaturation treatment. No proper texture can be obtained when these are added later.

After denaturation, the protein dispersion is cooled, optionally admixed with further ingredients and filled into containers. The dressing will obtain its final consistency in the container.

The invention employs only a few auxiliary agents in small amounts. The process of the invention proceeds in a simple and easy way and delivers a fat-free or low-fat storage-stable product with a plastic, smooth texture and an agreeable sour taste. Also, from a nutritional point of view, the dressing of the invention is an attractive product because fat is substituted by more valuable protein.

The invention is illustrated by the following examples:

EXAMPLE 1

Zero fat pourable dressing

A solution of 5 wt. % whey protein isolate in water was prepared, further containing 0.3 wt. % of NaCl and 0.25 wt. % of locust bean gum.

After acidifying to pH=3.8 with HCl, the solution was heated under gentle stirring for 10 minutes at 85° C. and was subsequently cooled in rest to 5° C.

β-carotene was added to the obtained plastic composition in order to give it a pale yellow colour. The product had an appearance similar to pourable dressings containing a relatively high amount of oil.

EXAMPLE 2

Zero fat spoonable dressing

A solution of 5 wt. % whey protein isolate in water was prepared, further containing 0.3 wt. % of NaCl and 1.5 wt. % of Col-Flo 67 (Trade Mark of National Starch Corporation, USA). After acidifying to pH=3.8 with HCl, the solution was heated under gentle stirring for 10 minutes at 85° C. and was subsequently cooled in rest to 5° C.

β-carotene was added to the obtained plastic composition in order to give it a pale yellow colour. The product had an appearance similar to spoonable dressings containing a relatively high amount of oil.

EXAMPLE 3

Zero fat pourable dressing

A solution of 7 wt. % whey protein isolate in water was prepared, further containing 0.35 wt. % of NaCl and 0.25 wt. % of locust bean gum. After acidifying to pH=3.8 with HCl, the solution was heated with gentle stirring for 10 minutes at 85° C. and was subsequently cooled in rest to 5° C.

β-carotene was added to the obtained plastic composition in order to give it a pale yellow colour. The product had an appearance similar to pourable dressings containing a relatively high amount of oil.

EXAMPLE 4

Zero fat spooning dressing

A solution of 7 wt. % whey protein isolate in water was prepared, further containing 0.35 wt. % of NaCl and 1.5 wt. % of Col-Flo 67 (Trade Mark of National Starch Corporation, USA). After acidifying to pH=3.8 with HCl, the solution was heated with gentle stirring for 10 minutes at 85° C. and was subsequently cooled in rest to 5° C.

β-carotene was added to the obtained plastic composition in order to give it a pale yellow colour. The product had an appearance similar to spoonable dressings containing a relatively high amount of oil.

EXAMPLE 5

Zero fat pourable dressing

A solution of 4 wt. % whey protein isolate in water was prepared, further containing 0.25 wt. % of NaCl and 0.3 wt. % of locust bean gum. After acidifying to pH=3.8 with HCl, the solution was heated with gentle stirring for 10 minutes at 85° C. and was subsequently cooled in rest to 5° C.

β-carotene was added to the obtained plastic composition in order to give it a pale yellow colour. The product had an appearance similar to pourable dressings containing a relatively high amount of oil.

EXAMPLE 6

Zero fat spooning dressing

A solution of 4 wt. %. whey protein isolate in water was prepared, further containing 0.25 wt. % of NaCl and 3 wt. % of Col-Flo 67 (Trade Mark of National Starch Corporation, USA). After acidifying to pH=3.8 with HCl, the solution was heated with gentle stirring for 10 minutes at 85° C. and was subsequently cooled in rest to 5° C.

β-carotene was added to the obtained plastic composition in order to give it a pale yellow colour. The product had an appearance similar to spoonable dressings containing a relatively high amount of oil.

Examples 1, 3 and 5 use locust bean gum at amounts of 0.25 or 0.3 wt. %. Pourable dressings have also been made in accordance with these examples, but using 0.1 wt. % and 0.4 wt. % locust bean gum. A relatively thin but acceptable dressing was prepared using 0.1 wt. % locust bean gum. A relatively thick but acceptable dressing was prepared using 0.4 wt. % locust bean gum.

EXAMPLES 7, 8 & 9

10, 20 & 40 wt. % oil spoonable dressings

Various ratios of the zero fat spoonable dressing of Example 2 and a traditional mayonnaise comprising 80 wt. % oil (and having no thickener and a pH of 3.75) were mixed to give spoonable dressings having an oil content of 10, 20 & 40 wt. % respectively, and a texture resembling that of traditional mayonnaise.

EXAMPLES 10, 11 & 12

10, 20 & 40 wt. % oil pourable dressings

Various ratios of the zero fat pourable dressing of Example 1 and a oil-in-water emulsion comprising 60 wt. % oil (and having a pH of 3.8) were mixed to give pourable dressings having an oil content of 10, 20 & 40 wt. % respectively.

Comparative Example A

A solution of 5% whey protein and 0.3% NaCl in water was prepared. The solution was acidified to pH 3.8 with HCl, heated at 85° C. for 10 minutes and cooled overnight at 5° C. The product obtained had a gel-like, brittle texture and a harsh acidic taste.

The omission of a non-ionic thickener in the process is clearly detrimental to the properties of the resulting dressing.

We claim:

1. Process for the preparation of a dressing having an aqueous phase, an optional fat phase and a pH <4, and comprising a heat-denatured globular protein, a non-ionic thickening agent and an electrolyte, the process comprising the steps of
   a. dissolving a globular protein, a non-ionic thickening agent and an electrolyte in water to form a protein solution,
   b. adjusting the pH <4 by adding acid,
   c. heating and slowly stirring the protein solution so that protein denaturation occurs,
   d. cooling,
wherein no ionic thickening agent is present in the protein solution during the acidifation of step b and during the heating step C.

2. Process according to claim 1, characterized in that the protein solution is heated at 80°–100° C.

3. Process according to claim 1, characterized in that the protein solution is heated for 5–30 minutes.

4. Process according to claim 1, characterized in that 3–8 wt. % of globular protein is employed.

5. Process according to claim 1, characterised in that the non-ionic thickening agent is selected from the group consisting of modified starches and gums.

6. Process according to claim 5, characterized in that the concentration of modified starch is 1.0–3.0 wt. %.

7. Process according to claim 5, characterized in that the concentration of gum is 0.1–0.5 wt. %.

8. Process according to claim 5, characterized in that the gum is locust bean gum or guar gum.

9. Process according to claim 1, characterized in that the protein is whey protein.

10. Process according to claim 1, characterized in that the composition contains 0.1–0.5 wt. % of an electrolyte.

11. Process according to claim 1, characterized in that the pH is 3.0–4.0.

12. Process according to claim 1, characterized in that the dressing comprises 0–10 wt. % of triglyceride fat calculated on dressing weight.

13. Process according to claim 1, characterized in that the dressing comprises 0–40 wt. % of oil calculated on dressing weight.

* * * * *